US012587945B2

(12) United States Patent
Patil et al.

(10) Patent No.: US 12,587,945 B2
(45) Date of Patent: Mar. 24, 2026

(54) USER EQUIPMENT POLICY RULE INCONSISTENCY DETERMINATION USING DETECTION CODES

(71) Applicant: Verizon Patent and Licensing Inc., Basking Ridge, NJ (US)

(72) Inventors: Sudhakar Reddy Patil, Flower Mound, TX (US); David Taft, Keller, TX (US); Samirkumar Patel, Middlesex, NJ (US); Lixia Yan, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 323 days.

(21) Appl. No.: 18/508,327

(22) Filed: Nov. 14, 2023

(65) Prior Publication Data

US 2025/0159583 A1     May 15, 2025

(51) Int. Cl.
H04W 40/34         (2009.01)
H04W 40/24         (2009.01)

(52) U.S. Cl.
CPC ......... H04W 40/34 (2013.01); H04W 40/248 (2013.01)

(58) Field of Classification Search
CPC ............................ H04W 40/34; H04W 40/248
USPC .......................................................... 370/328
See application file for complete search history.

(56) References Cited

U.S. PATENT DOCUMENTS 11,681,568 B1 *   6/2023   Hinrichs ................. G06F 9/547
                                                        726/1
12,086,431 B1 *   9/2024   Dreier ................ G06F 16/1827

12,181,981 B1 *  12/2024   Heidemeyer ......... G06F 16/275
2003/0115484 A1 *   6/2003   Moriconi ................ H04L 63/20
                                                        726/1
2013/0242754 A1 *   9/2013   Shaikh .................. H04W 24/04
                                                        370/242

(Continued)

FOREIGN PATENT DOCUMENTS

CN         112205015 A  *   1/2021   ........... H04W 8/205
CN         114424179 A  *   4/2022   ........... G06F 16/176

(Continued)

OTHER PUBLICATIONS

Technical Specification: 3rd Generation Partnership Project; Technical Specification Group Services and System Aspects; Procedures for the 5G System (5GS); Stage 2 (Release 18),3GPP TS 23.502 V18.1.1 (Apr. 2023); 829 pages.

(Continued)

*Primary Examiner* — Mahendra R Patel

(57)                    ABSTRACT

A device receives User Equipment device (UE) Policy Section Codes (UPSCs) and a first version of associated UE policy rules. The device further receives first inconsistency detection codes for the UPSCs and a current version of the associated UE policy rules. The device determines, based on the UPSCs and the first version of the associated UE policy rules, second inconsistency detection codes, and compares the first and second inconsistency detection codes to identify inconsistencies between the first version of the UE policy rules and the current version of the UE policy rules. The device sends, when the comparison identifies the inconsistencies, a request for updated UE policy rules, and receives one of the UPSCs and an updated version of an associated UE policy rule of the one of the UPSCs.

20 Claims, 11 Drawing Sheets

(56)     References Cited

U.S. PATENT DOCUMENTS

| | | | | |
|---|---|---|---|---|
| 2018/0332523 A1* | 11/2018 | Faccin | ................. | H04W 36/13 |
| 2021/0084582 A1* | 3/2021 | Li | ........................ | H04W 16/02 |
| 2022/0174580 A1* | 6/2022 | You | .................... | H04W 12/102 |
| 2022/0201638 A1* | 6/2022 | Arrobo Vidal | ........ | H04W 48/08 |
| 2022/0303935 A1* | 9/2022 | Olsson | ................. | H04W 12/06 |
| 2023/0403173 A1* | 12/2023 | Zhang | ................. | H04M 15/83 |
| 2025/0028630 A1* | 1/2025 | Byrne | .................. | G06F 11/368 |

FOREIGN PATENT DOCUMENTS

| | | | | | |
|---|---|---|---|---|---|
| CN | 117009184 A | * | 11/2023 | .......... | G06F 11/3093 |
| DE | 112022003844 T5 | * | 5/2024 | ........... | H04L 9/3247 |
| EP | 3863242 A1 | * | 8/2021 | ......... | H04L 61/5007 |
| EP | 3863243 A1 | * | 8/2021 | ............ | H04L 45/02 |
| KR | 20240149680 A | * | 10/2024 | ........... | H04W 76/11 |

OTHER PUBLICATIONS

Technical Specification: 5G; Non-Access-Stratum (NAS) protocol for 5G System (5GS); Stage 3 (3GPP TS 24.501 version 15.1.0 Release 15); ETSI TS 124 501 V15.1.0 (Oct. 2018); 406 pages.

* cited by examiner

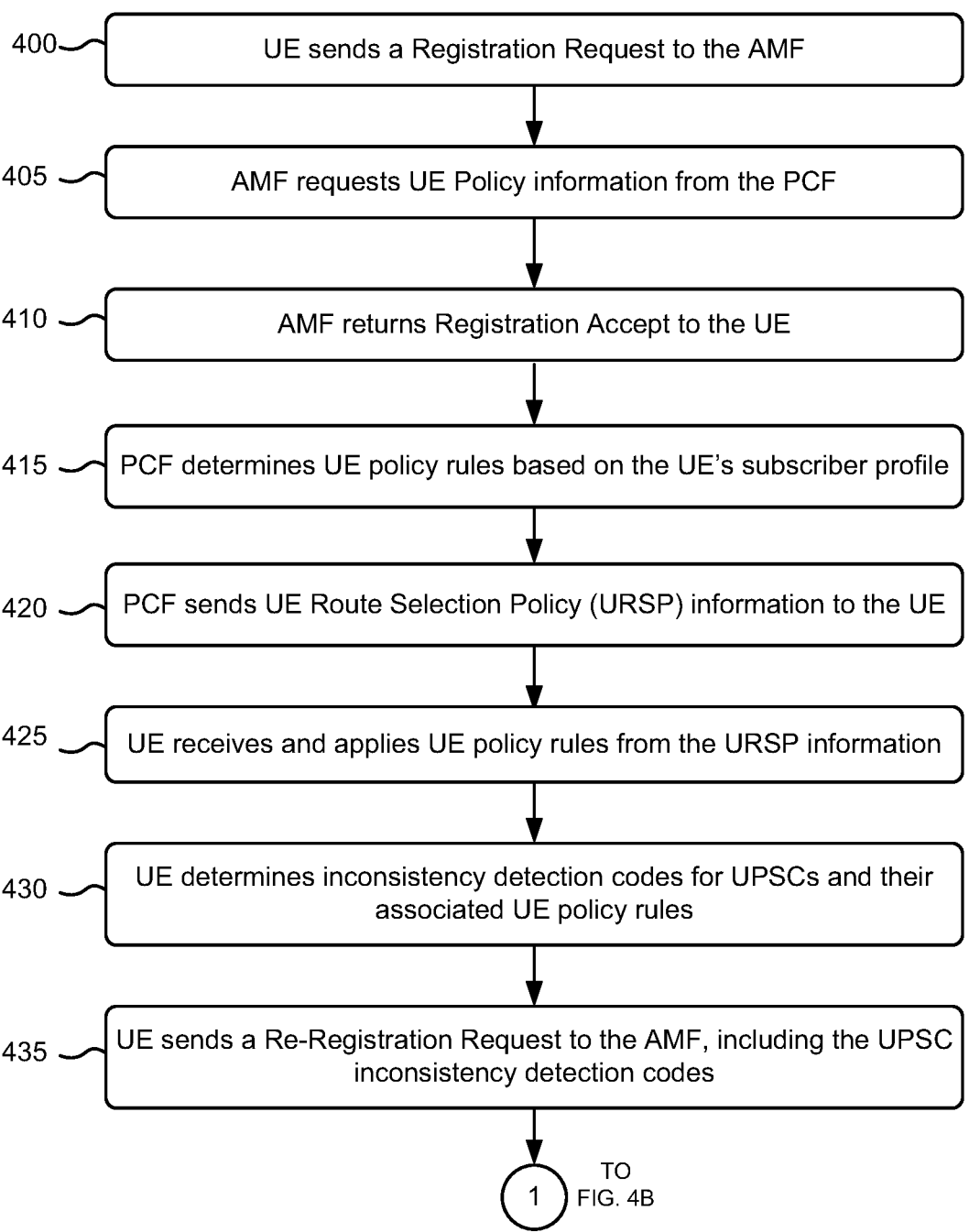

400 — UE sends a Registration Request to the AMF

405 — AMF requests UE Policy information from the PCF

410 — AMF returns Registration Accept to the UE

415 — PCF determines UE policy rules based on the UE's subscriber profile

420 — PCF sends UE Route Selection Policy (URSP) information to the UE

425 — UE receives and applies UE policy rules from the URSP information

430 — UE determines inconsistency detection codes for UPSCs and their associated UE policy rules 435 — UE sends a Re-Registration Request to the AMF, including the UPSC inconsistency detection codes

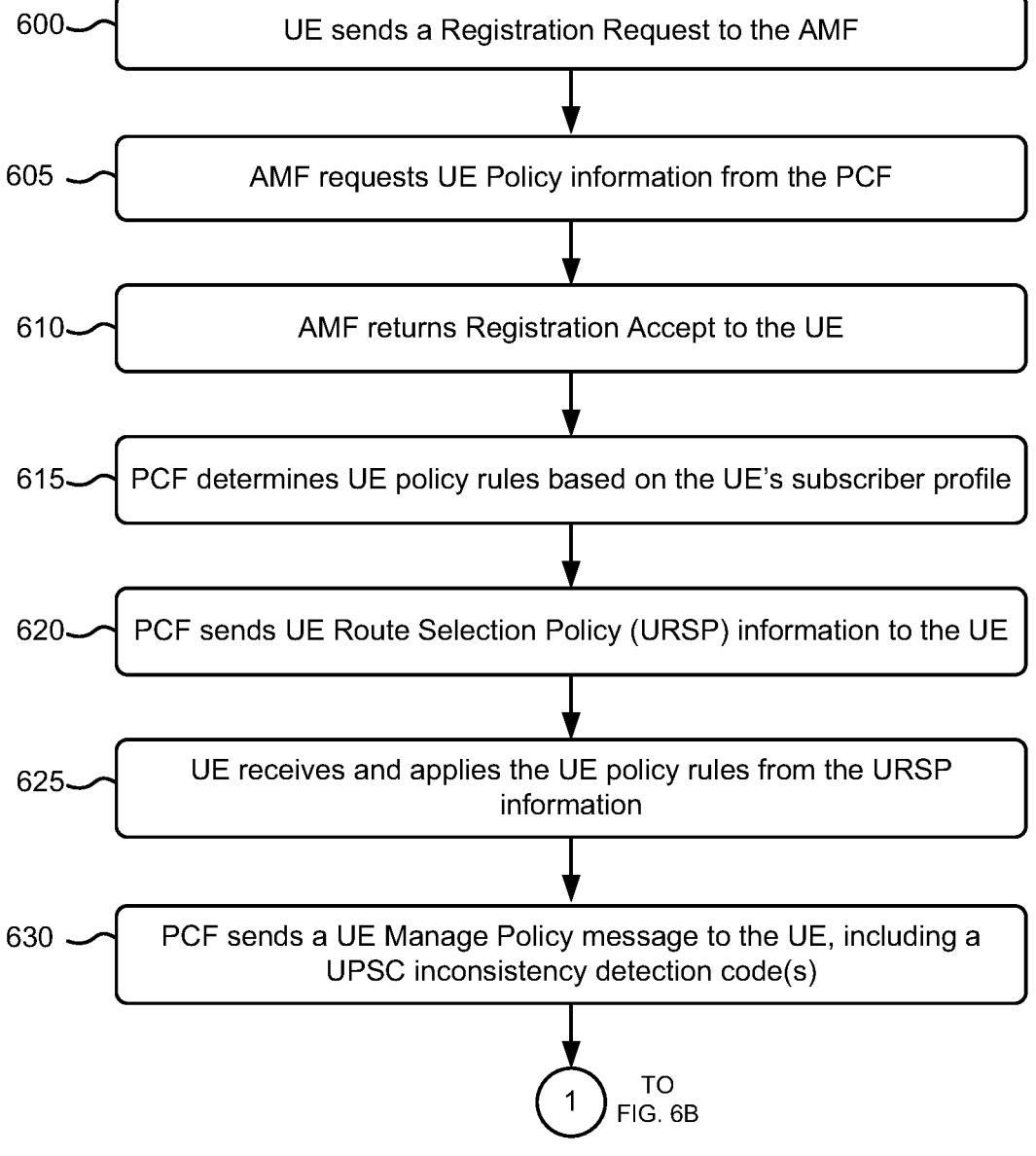

600 — UE sends a Registration Request to the AMF

605 — AMF requests UE Policy information from the PCF

610 — AMF returns Registration Accept to the UE

615 — PCF determines UE policy rules based on the UE's subscriber profile

620 — PCF sends UE Route Selection Policy (URSP) information to the UE

625 — UE receives and applies the UE policy rules from the URSP information

630 — PCF sends a UE Manage Policy message to the UE, including a UPSC inconsistency detection code(s)

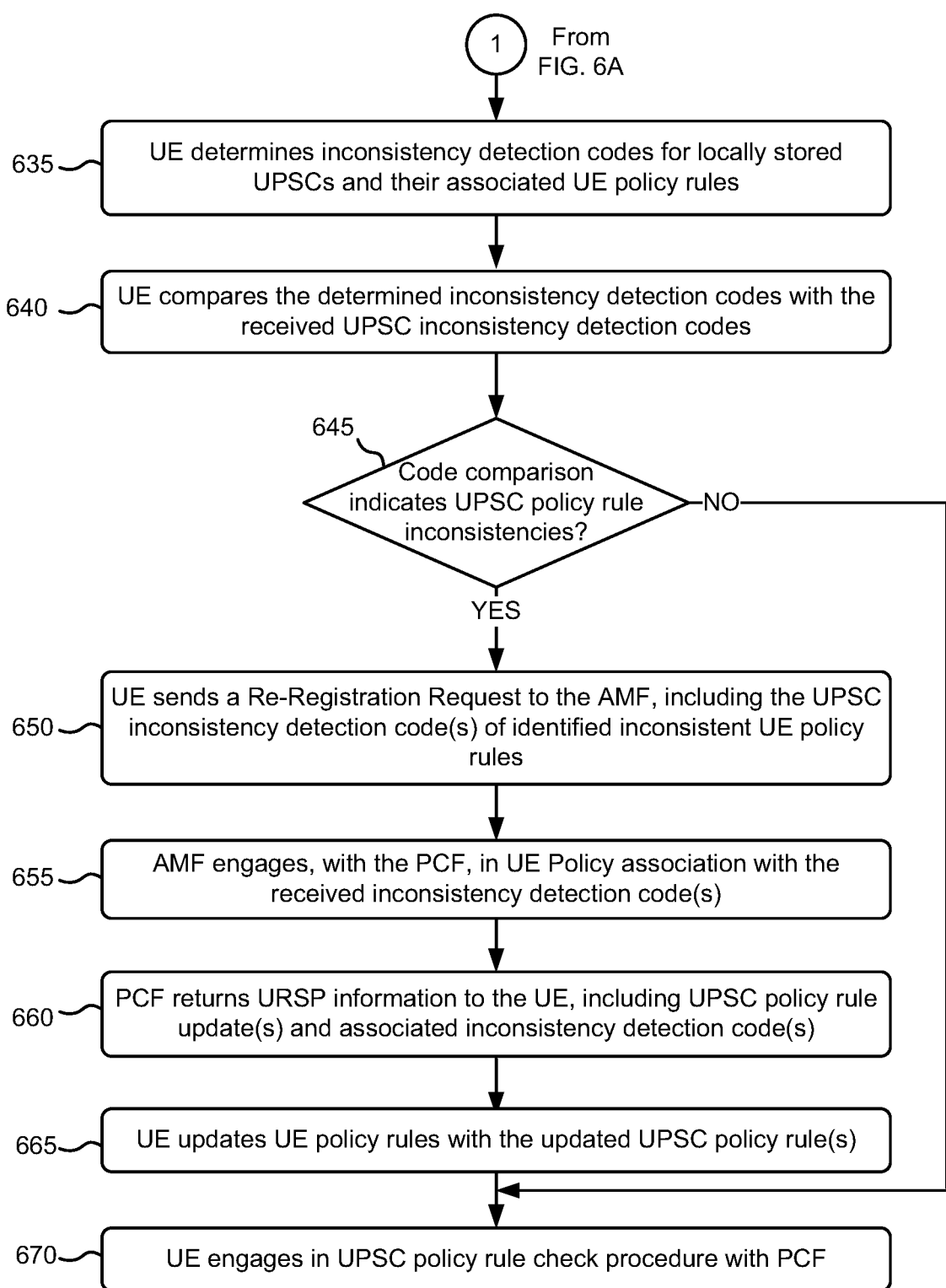

① From FIG. 6A

635 — UE determines inconsistency detection codes for locally stored UPSCs and their associated UE policy rules 640 — UE compares the determined inconsistency detection codes with the received UPSC inconsistency detection codes 645 — Code comparison indicates UPSC policy rule inconsistencies?

NO

YES

650 — UE sends a Re-Registration Request to the AMF, including the UPSC inconsistency detection code(s) of identified inconsistent UE policy rules 655 — AMF engages, with the PCF, in UE Policy association with the received inconsistency detection code(s)

660 — PCF returns URSP information to the UE, including UPSC policy rule update(s) and associated inconsistency detection code(s)

665 — UE updates UE policy rules with the updated UPSC policy rule(s)

670 — UE engages in UPSC policy rule check procedure with PCF

FIG. 6B

USER EQUIPMENT POLICY RULE INCONSISTENCY DETERMINATION USING DETECTION CODES

BACKGROUND

"Network Slicing" is an innovation for implementation in Next Generation Mobile Networks, such as, for example, Fifth Generation (5G) Mobile Networks. Network slicing is a type of virtualized networking architecture that involves partitioning of a single physical network into multiple virtual networks that may be composed of various Virtual Network Functions (VNFs). The partitions, or "slices," of a virtualized network, including each slice's VNFs, may be customized to meet the specific needs of applications, services, devices, customers, or operators. Each network slice can have its own architecture, provisioning management, and security that supports data sessions transported over the network slice. Bandwidth, capacity, and connectivity functions are allocated within each network slice to meet the requirements of the objective of the particular network slice. For example, each network slice, when created in a mobile network, may be designed to satisfy one or more performance characteristics or performance requirements for data sessions that are serviced by the network slice. Network slicing may be implemented in a dynamic fashion, such that the slices of the virtualized network may change over time and may be re-customized to meet new or changing needs of applications, services, devices, customers, or operators.

BRIEF DESCRIPTION OF THE DRAWINGS

FIGS. 4A and 4B are flow diagrams of an example UE-initiated process for determining UE policy rule changes for a mobile subscriber in a mobile network and updating one or more UE policy rules at the UE based on the determined UE policy changes;

FIGS. 6A and 6B are flow diagrams of an example mobile network-initiated process for determining UE policy rule changes for a mobile subscriber in a mobile network and updating one or more UE policy rules at the UE based on the determined UE policy changes.

DETAILED DESCRIPTION

The following detailed description refers to the accompanying drawings. The same reference numbers in different drawings may identify the same or similar elements. The following detailed description does not limit the invention.

Network slicing is a key benefit of Next Generation wireless network architectures, such as the Fifth Generation (5G) mobile network architecture. Next Generation mobile networks are expected to support network slices that satisfy one or more performance characteristics for data sessions that are serviced by the network slices. Particular network slices may be built to support a class of applications (e.g., gaming, productivity apps, media streaming, messaging) requiring particular capabilities or performance characteristics, such as, for example, low latency and/or high uplink bandwidth.

To enable UEs and their apps to steer traffic among multiple network slices implemented in a mobile network, UE Route Selection Policy (URSP) procedures can be used to distribute UE policies from the Policy Control Function (PCF) in the mobile network to the UEs. URSP enables the mobile network to manage network slice information, and UE policy rules, for each UE. Upon receipt of URSP distributed UE policies rules from the PCF, each UE may apply the UE policy rules to select a network slice(s) over which to route particular traffic. Within current Third Generation Partnership Project (3GPP) specifications, UE Policy Section Codes (UPSCs) are used for communicating UE policy rules between the PCF and the UE. When there is a need to add or modify policy rules at a UE, within current 3GPP specifications, the UPSC policy number would have to change to avoid UE policy rule inconsistencies between the PCF and the UE. Example embodiments described herein use UPSC inconsistency detection codes between the UE and the mobile network to determine if one or more UE policy rules have changed. When a detection code inconsistency occurs, the PCF sends a latest, updated UPSC, and associated UE policy rule, to the UE such that the UE can update its locally stored UE policy rules and apply the updated UE policy rules to traffic at the UE.

Figure 1:
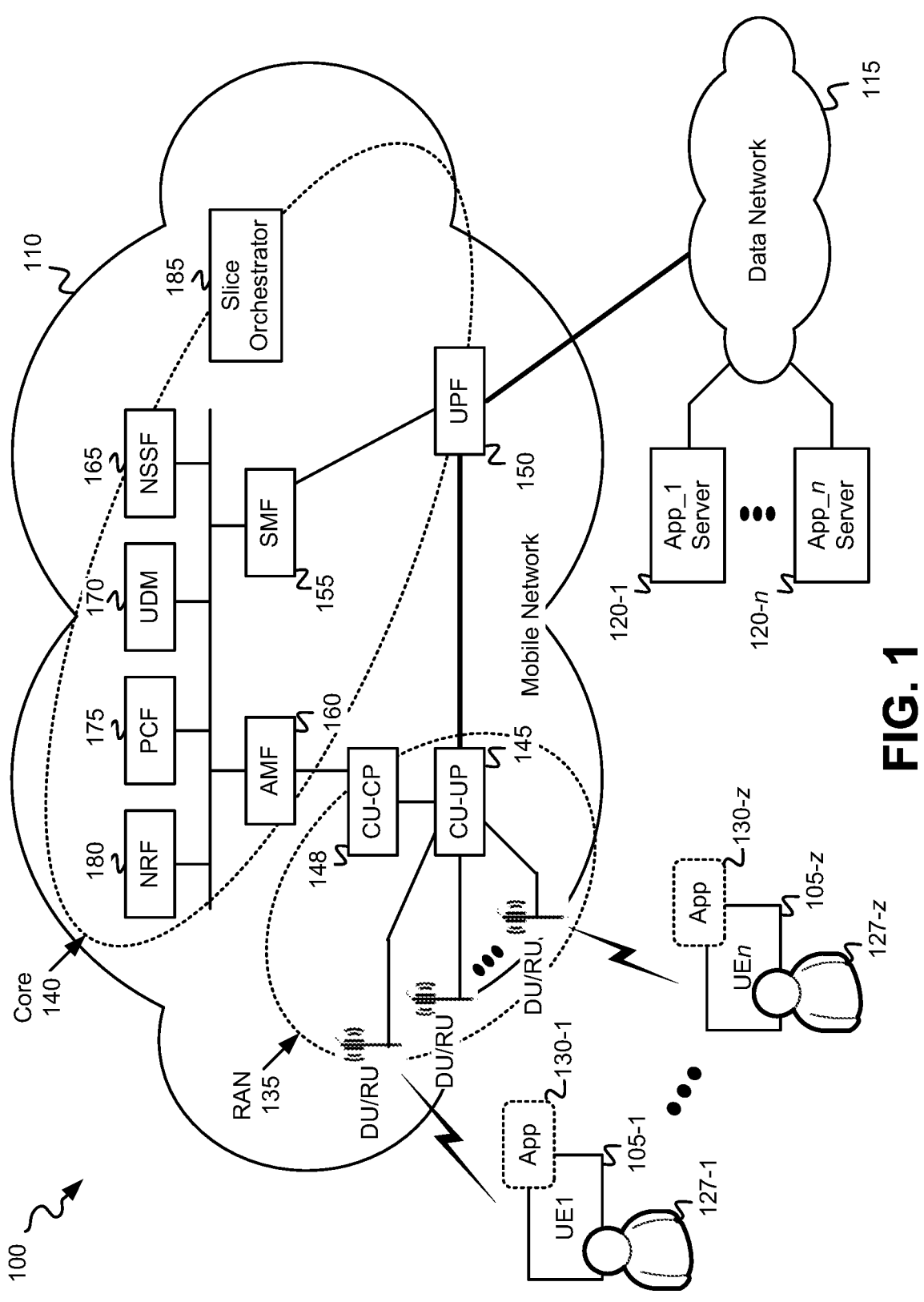
FIG. 1 depicts an example of a network environment in which detection codes may be used for determining inconsistencies between User Equipment device (UE) policy rules stored at a UE and corresponding UE policy rules stored in the mobile network.

FIG. 1 depicts an example of a network environment 100 in which detection codes may be used for determining inconsistencies between UE policy rules stored at a UE and corresponding UE policy rules stored in the mobile network. As shown, network environment 100 may include UEs 105-1 through 105-z, a mobile network 110, a data network(s) 115, and application servers 120-1 through 120-n.

UEs 105-1 through 105-z (generically referred to herein as a "UE 105," "UEs 105," "mobile device," or "mobile devices") may each include any type of device having a communication capability, such as, for example, a wireless communication capability. Each UE 105 may include a mobile device such as, for example, a laptop, palmtop, wearable, or tablet computer; a cellular phone (e.g., a "smart" phone); a Voice over Internet Protocol (VOIP) phone; an audio speaker (e.g., a "smart" speaker); a video gaming device; a music player (e.g., a digital audio player); a digital camera; a device in a vehicle; a wireless telematics device; an Augmented Reality/Virtual Reality (AR/VR) headset or glasses; or an Internet of Things (IoT) or Machine-to-Machine (M2M) device. A user may carry, use, administer, and/or operate each UE 105. A user 127-1 is shown in association with UE 105-1 and a user 127-z is shown in association with UE 105-z. Each user 127 may also be referred to herein as a "mobile subscriber" or a "subscriber."

Each UE 105 may have installed, and may execute, at least one application (app) that can be used to establish data sessions with a respective app server (or with another destination node). An app 130-1 is shown executing at UE 105-1, and an app 130-z is shown executing at UE 105-z. In one example, app 130-1 executing at UE 105-1 may connect, and establish a session, with app server 120-1, and app 130-z executing at UE 105-z may connect, and establish a session, with app server 120-n. Each app 130 may generate data traffic that has particular characteristics and has particular network performance requirements for achieving a desired level of user experience for the user 127 at a respective UE 105. For example, a particular app 130 may require a high bandwidth, and a certain maximum level of latency, over mobile network 110 to ensure a high-quality user experience at the UE 105. As another example, a different app 130 may require Ultra Reliable Low Latency Communications (URLLC) over mobile network 110. Though FIG. 1 only shows a single app 130 at each UE 105, each UE 105 may be installed with, and may execute, multiple apps 130 whose traffic may be selectively routed, by application of UE policy rules at each UE 105, via one of multiple different network slices implemented in mobile network 110.

Mobile network 110 may include a Public Land Mobile Network (PLMN) (referred to herein as a "mobile network 110" or a "network 110") and possibly one or more other networks. Mobile network 110 may include one or more sub-networks, such as a Radio Access Network (RAN) 135 and a mobile core network 140 (referred to herein as "core network 140" or "mobile core network 140"). Mobile network 110 may include one or more nodes/functions (e.g., UPF(s) 150) that interconnect with data network 115.

RAN 135 may include various types of radio access equipment that implement Radio Frequency (RF) communication with UEs 105. The radio access equipment of RAN 135 may include, for example, multiple Distributed Units (DUs) and Remote Units (RUs), and at least one Control Unit-User Plane function (CU-UP) 145 and at least one Control Unit-Control Plane (CU-CP) function 148. Only a single one of CU-UP 145 and CU-CP 148 is shown in FIG. 1, however, RAN 135 may include multiple CU-CPs and CU-UPs. Each DU includes a logical node that hosts functions associated with the Radio Link Control (RLC) layer, the Medium Access Control (MAC) layer, and the physical layer (PHY). A RU may be connected to each DU, and each RU may include at least one radio transceiver, and associated antenna(s), for RF wireless communication with one or more UEs 105 within radio range of the RU.

CU-UP 145 may interconnect with one or more DUs of RAN 135 via fronthaul links or a fronthaul network, and may include a logical node that hosts user plane functions, such as, for example, data routing and transport functions. CU-CP 148 includes a logical node that hosts Radio Resource Control (RRC), and other control plane, functions (e.g., Service Data Adaptation Protocol (SDAP), Packet Data Convergence Protocol (PDCP)) for the CU-UP 145. RAN 135 may additionally include other nodes, functions, and/or components not shown in FIG. 1.

Core network 140 includes devices or nodes that implement network functions (NFs) that operate the mobile network 110 including, among other NFs, mobile network access management, session management, and policy control NFs. In the example network environment 100 of FIG. 1, core network 140 is shown as including a 5G mobile network that further includes 5G Network Functions (NFs), such as a User Plane Function (UPF) 150, a Session Management Function (SMF) 155, an Access and Mobility Management Function (AMF) 160, a Network Slice Selection Function (NSSF) 165, a Unified Data Management (UDM) function 170, a Policy Control Function (PCF) 175, a Network Repository Function (NRF) 180, and a slice orchestrator 185. UPF 150, SMF 155, AMF 160, NSSF 165, UDM 170, PCF 175, NRF 180, and slice orchestrator 185 may be implemented as Virtual Network Functions (VNFs) within mobile network 110.

UPF 150 may act as a router and a gateway between mobile network 110 and data network 115, and forward session data between data network 115 and RAN 135. Though only a single UPF 150 is shown in FIG. 1, mobile network 110 may include multiple UPFs 150 residing at various locations in network 110. SMF 155 performs session management, allocates network addresses to UEs 105, and selects and controls UPFs 150 for data transfer. AMF 160 performs authentication, authorization, and mobility management for UEs 105. NSSF 165 selects a set of network slice instances (NSIs) that may serve a UE 105, and determines the single Network Slice Selection Assistance Information (S-NSSAIs) for one or more network slices for use by the UE 105. UDM 170 manages data for user access authorization, user registration, and data network profiles. UDM 170 may include, or operate in conjunction with, a User Data Repository (UDR—not shown) which stores user data, such as customer profile information, customer authentication information, and encryption keys. PCF 175 implements policy and charging control for service data flows and Protocol Data Unit (PDU) session related policy control. PCF 175 may additionally, as described herein, implement URSP procedures for managing UE policy rules and distributing the UE policy rules to UEs 105 connected to mobile network 110, such as, for example, either via a wireless connection to RAN 135 or a wireless connection (e.g., Wi-Fi) to data network 115.

NRF 180 operates as a centralized repository of information regarding NFs in mobile network 110. NRF 180 enables NFs (e.g., UPF 150, SMF 155, AMF 160, UDM 170) to register and discover each other via an Application Programming Interface (API). NRF 180 maintains an updated repository of information about the NFs available in mobile network 110, along with information about the services provided by each of the NFs. NRF 180 further enables the NFs to obtain updated status information of other NFs in mobile network 110. NRF 180 may, for example, maintain profiles of available NF instances and their supported services, allow NF instances to discover other NF instances in mobile network 110, and allow NF instances to track the status of other NF instances.

Slice orchestrator 185 performs, among other operations and functions, network slice and Network Slice Instance (NSI) creation, virtual network resource allocation, instantiation, and provisioning, and network slice and NSI monitoring, reporting, and life cycle management (LCM). NSSF 165 may obtain NSI and network slicing configuration information from slice orchestrator 185.

Data network 115 may include one or more interconnected networks, such as local area networks (LANs), wide area networks (WANs), metropolitan area networks (MANs), and/or the Internet. Data network 115 may, for example, connect with UPFs 150 of mobile network 110. Apps 130-1 through 130-z may connect to data network 115 and may communicate indirectly with UEs 105 via data network 115, UPF 150, and one or more CU-UPs 145.

The configuration of network components of the example network environment 100 of FIG. 1 is for illustrative purposes. Other configurations may be implemented. Therefore, network environment 100 may include additional, fewer, and/or different components that may be configured in a different arrangement than that depicted in FIG. 1. For example, core network 140 may include other NFs not shown in FIG. 1. As a further example, though mobile network 110 is depicted in FIG. 1 as a 5G network having 5G network components/functions, mobile network 110 may alternatively include a Fourth Generation (4G) or 4.5G network with corresponding network components/functions, or a hybrid Next Generation/4G network that includes certain components of both a Next Generation network (e.g., a 5G network) and a 4G network as well as other future generation networks (i.e., 6G, 7G, etc.). Additionally, though only a single one of each of the NFs (i.e., UPF 150, SMF 155, AMF 160, NSSF 165, UDM 170, PCF 175, and NRF 180) is shown in FIG. 1, mobile network 110 may include multiple instances of each of these NFs. For example, each network slice (as described with respect to FIG. 2 below) may include its own SMF 155, PCF 175, and UPF 150.

Figure 2:
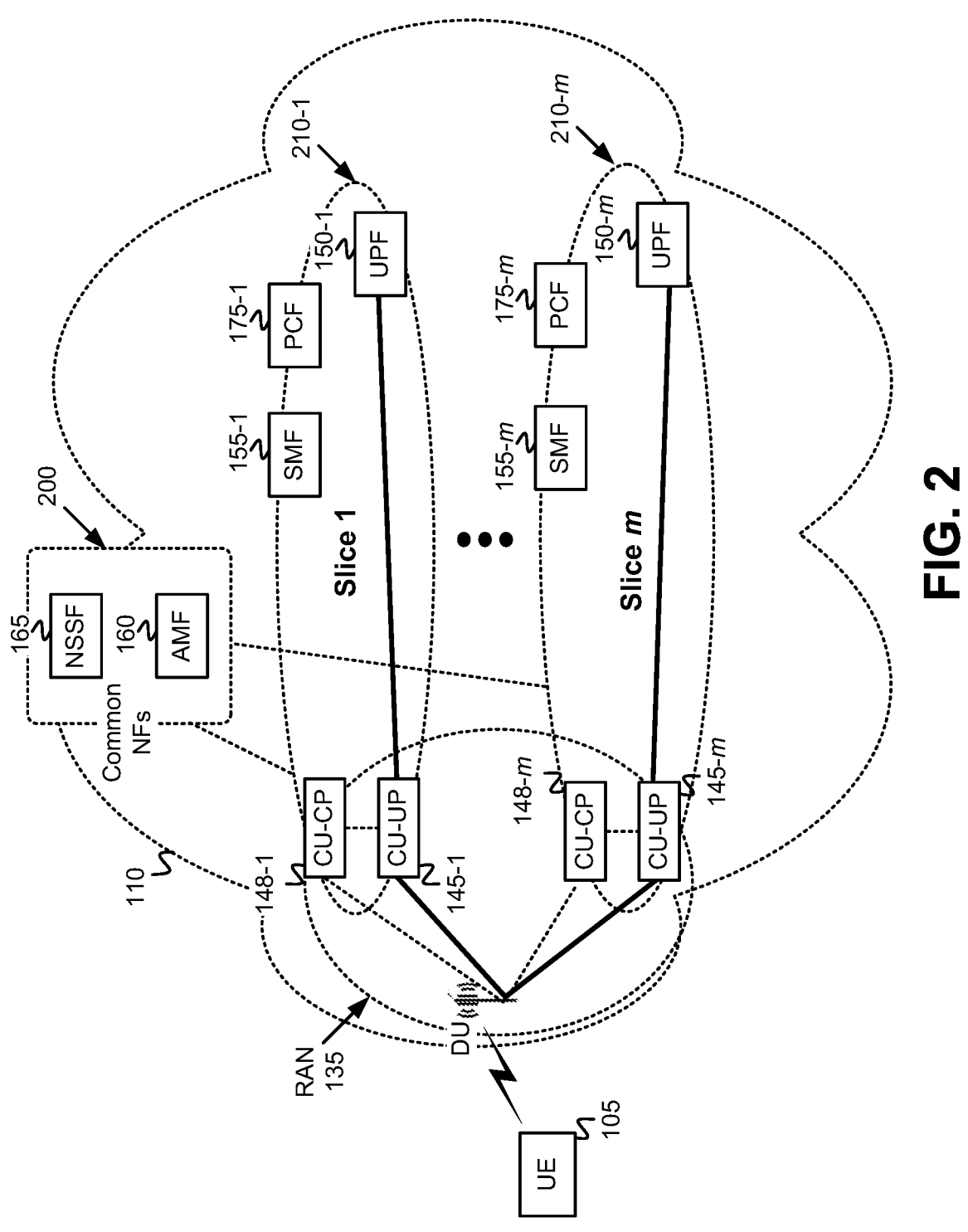
FIG. 2 depicts an example of the division of a mobile network into multiple network slices.

FIG. 2 depicts an example of the division of the mobile network 110 into multiple (m) network slices. Each network slice of network slices 210-1 through 210-*m* may include a logical end-to-end network, which may run on a shared physical infrastructure, that is created to serve a particular purpose and/or service data traffic (e.g., of particular applications) with a particular set of performance parameters or characteristics. For example, each network slice of network slices 210-1 through 210-*m* may service a particular service type and/or may satisfy or meet particular network performance requirements for sessions served by the network slice. In some implementations, each network slice may have a different Slice/Service Type (SST), such as, for example, an enhanced Mobile Broadband (eMBB) SST, an Ultra Reliable Low Latency Communications (URLLC) SST, or a Massive Internet of Things (mIoT) SST. Each network slice may, however, have a different SST not described herein.

As shown in FIG. 2, a group of common NFs 200 of mobile network 110 may service the various different network slices 210-1 through 210-*m* (where m is greater than or equal to two) and, therefore, may not be considered to be included within the network slices 210-1 through 210-*m*. In the example shown, the common NFs 200 of mobile network 110 may include an AMF 160 and a NSSF 165.

Each network slice may include its own dedicated set of NFs, where each NF operates to service UE sessions handled by that particular network slice. For example, as shown in FIG. 2, network slice 210-1 includes SMF 155-1, PCF 175-1, UPF 150-1, CU-UP 145-1, and CU-CP 148-1 that may operate to exclusively service traffic of UE sessions within network slice 210-1. As a further example, network slice 210-*m* includes SMF 155-*m*, PCF 175-*m*, UPF 150-*m*, CU-UP 145-*m*, and CU-CP 148-*m* that may operate to exclusively service traffic of UE sessions within network slice 210-*m*.

Each network slice 210 may be served by one or more NSIs. An NSI, as referred to herein, includes a set of NF instances and the resources (e.g., compute, storage, and networking resources) required to form a deployed NSI for serving a particular network slice. Thus, each network slice 210 may include one or more NSIs, with each NSI serving the overall purpose and/or performance requirements of the network slice 210 within the constraints of the network slice 210, and each NSI may be assigned its own NSI identifier (ID). Each network slice 210 may be assigned a Single-Network Slice Selection Assistance Information (S-NSSAI) value that uniquely identifies the network slice. The S-NSSAI value may, for example, include a Slice/Service Type (SST) value and a Slice Differentiator (SD) value (e.g., S-NSSAI=SST+SD). The SST may define the expected behavior of the network slice in terms of specific features and services. The SD value may be directly related to the SST value and may be used as an additional differentiator (e.g., if multiple network slices carry the same SST value). The S-NSSAI and NSI IDs, of the different NSIs within the network slice, may be used within mobile network 110 for network slice and NSI selection for servicing UE sessions.

Figure 3:
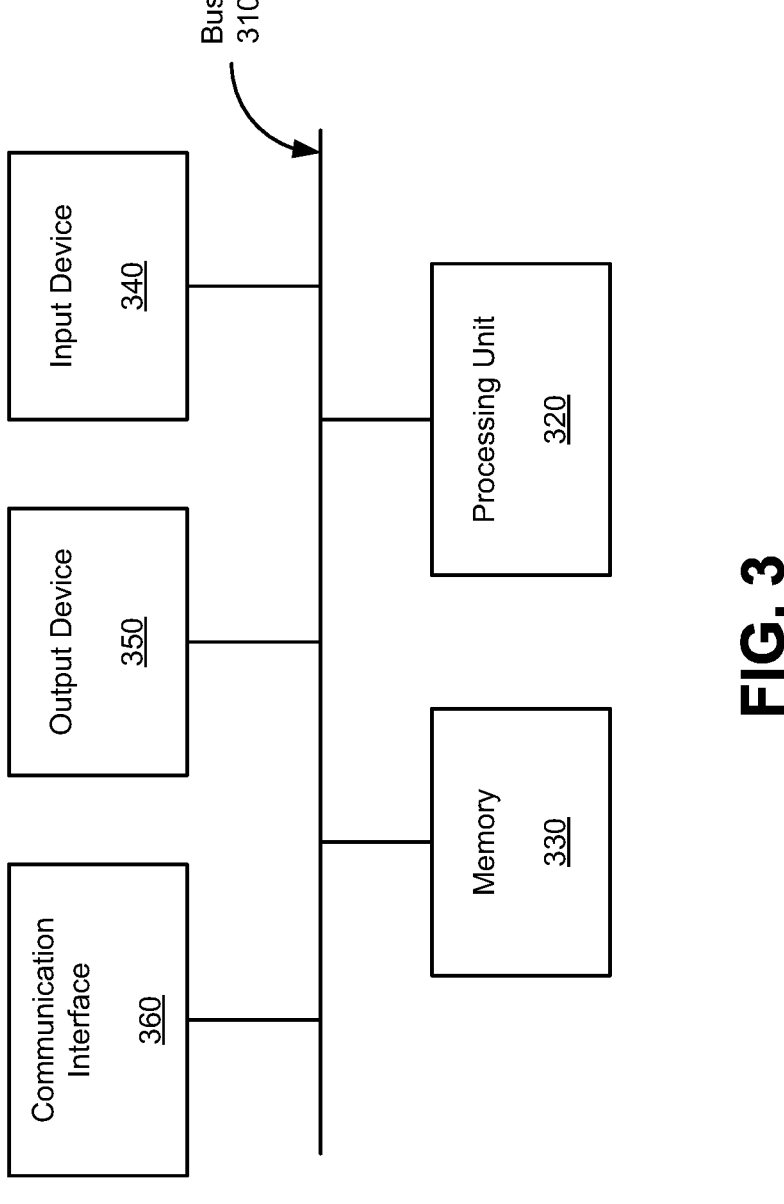
FIG. 3 is a diagram that depicts example components of a device described herein.

FIG. 3 is a diagram that depicts example components of a network device 300 (referred to herein as a "network device" or a "device"). UEs 105, the DUs and RUs of RAN 135, and slice orchestrator 185 may include components that are the same as, or similar to, those of device 300 shown in FIG. 3. Furthermore, each of the network functions UPF 150, SMF 155, AMF 160, NSSF 165, UDM 170, PCF 175, and NRF 180 may be implemented by a device that includes components that are the same as, or similar to, those of network device 300. Some of the NFs UPF 150, SMF 155, AMF 160, NSSF 165, UDM 170, PCF 175, and NRF 180 may be implemented by a same device 300 within mobile network 110, while others of the functions may be implemented by one or more separate devices 300 within mobile network 110.

Device 300 may include a bus 310, a processing unit 320, a memory 330, an input device 340, an output device 350, and a communication interface 360. Bus 310 may include a path that permits communication among the components of device 300. Processing unit 320 may include one or more processors or microprocessors which may interpret and execute instructions, or processing logic. Memory 330 may include one or more memory devices for storing data and instructions. Memory 330 may include a random access memory (RAM) or another type of dynamic storage device that may store information and instructions for execution by processing unit 320, a Read Only Memory (ROM) device or another type of static storage device that may store static information and instructions for use by processing unit 320, and/or a magnetic, optical, or flash memory recording and storage medium. The memory devices of memory 330 may each be referred to herein as a "tangible non-transitory computer-readable medium," "non-transitory computer-readable medium," or "non-transitory storage medium." In some implementations, the processes/methods (or portions of the processes/methods) set forth herein can be implemented as instructions that are stored in memory 330 for execution by processing unit 320.

Input device 340 may include one or more mechanisms that permit an operator to input information into device 300, such as, for example, a keypad or a keyboard, a display with a touch sensitive panel, voice recognition and/or biometric mechanisms, etc. Output device 350 may include one or more mechanisms that output information to the operator, including a display, a speaker, etc. Input device 340 and output device 350 may, in some implementations, be implemented as a user interface (UI) that displays UI information and which receives user input via the UI. Communication interface 360 may include a transceiver(s) that enables device 300 to communicate with other devices and/or systems. For example, communication interface 360 may include one or more wired and/or wireless transceivers for communicating via mobile network 110 and/or data network 115. In the case of RUs of RAN 135, communication interface 360 may further include one or more antenna arrays for producing radio frequency (RF) cells or cell sectors.

The configuration of components of network device 300 illustrated in FIG. 3 is for illustrative purposes. Other configurations may be implemented. Therefore, network device 300 may include additional, fewer and/or different components, that may be arranged in a different configuration, than depicted in FIG. 3.

Figure 4B:
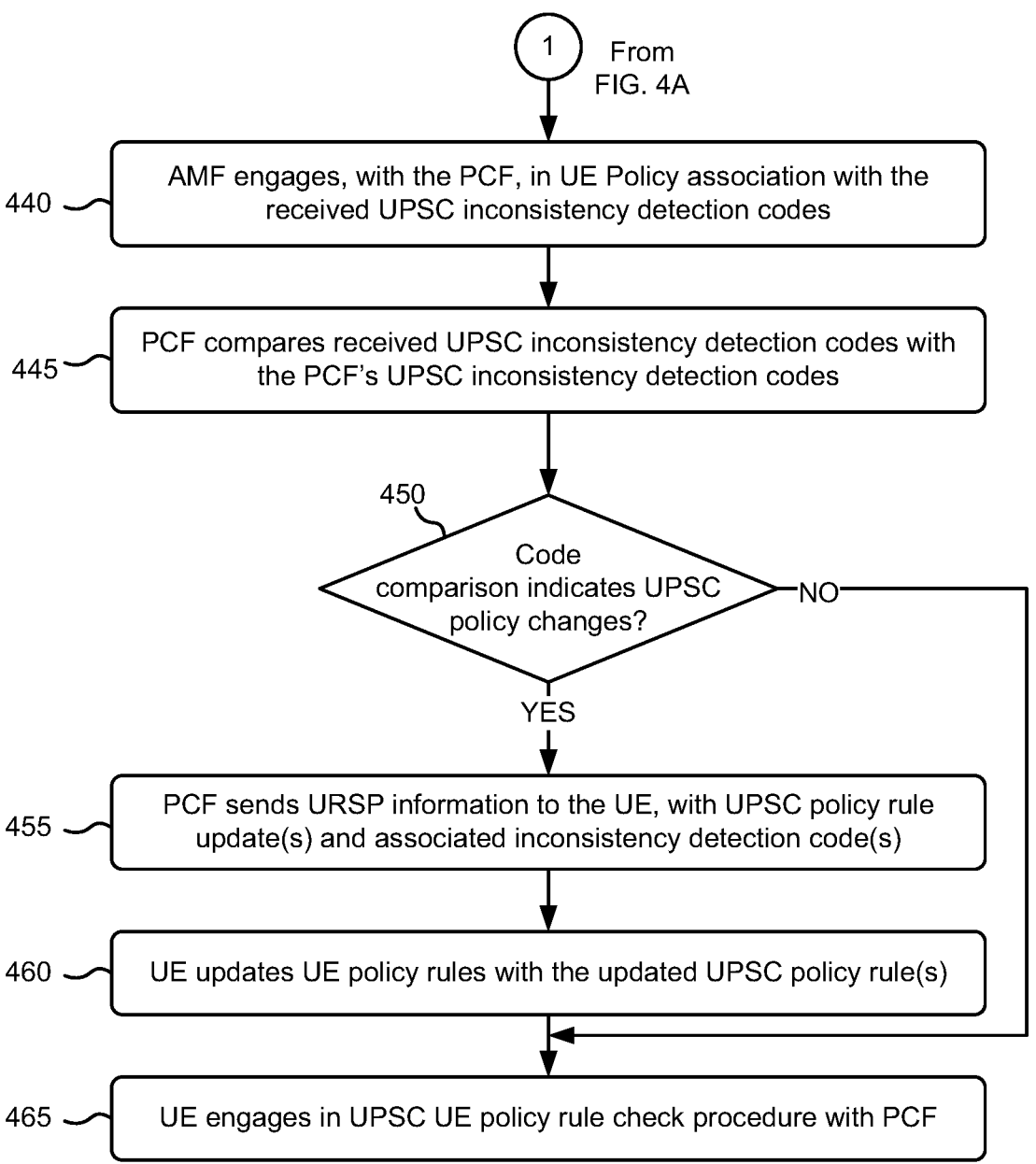

FIGS. 4A and 4B are flow diagrams of an example UE-initiated process for determining UE policy rule changes for a mobile subscriber in a mobile network 110 and updating one or more UE policy rules at the UE 105 based on the determined UE policy changes. The example process of FIGS. 4A and 4B may be implemented by various devices, nodes, and/or functions within the network environment 100 of FIG. 1, such as, for example, a UE 105, an AMF 160, and a PCF 175. The process of FIGS. 4A and 4B may be implemented, for example, at each occurrence of a UE 105 registering with mobile network 110 to obtain network service (e.g., at UE power on, or UE movement into the mobile network 110's service area). The example process of FIGS. 4A and 4B is described with additional reference to FIGS. 5A and 5B.

Figure 5A:
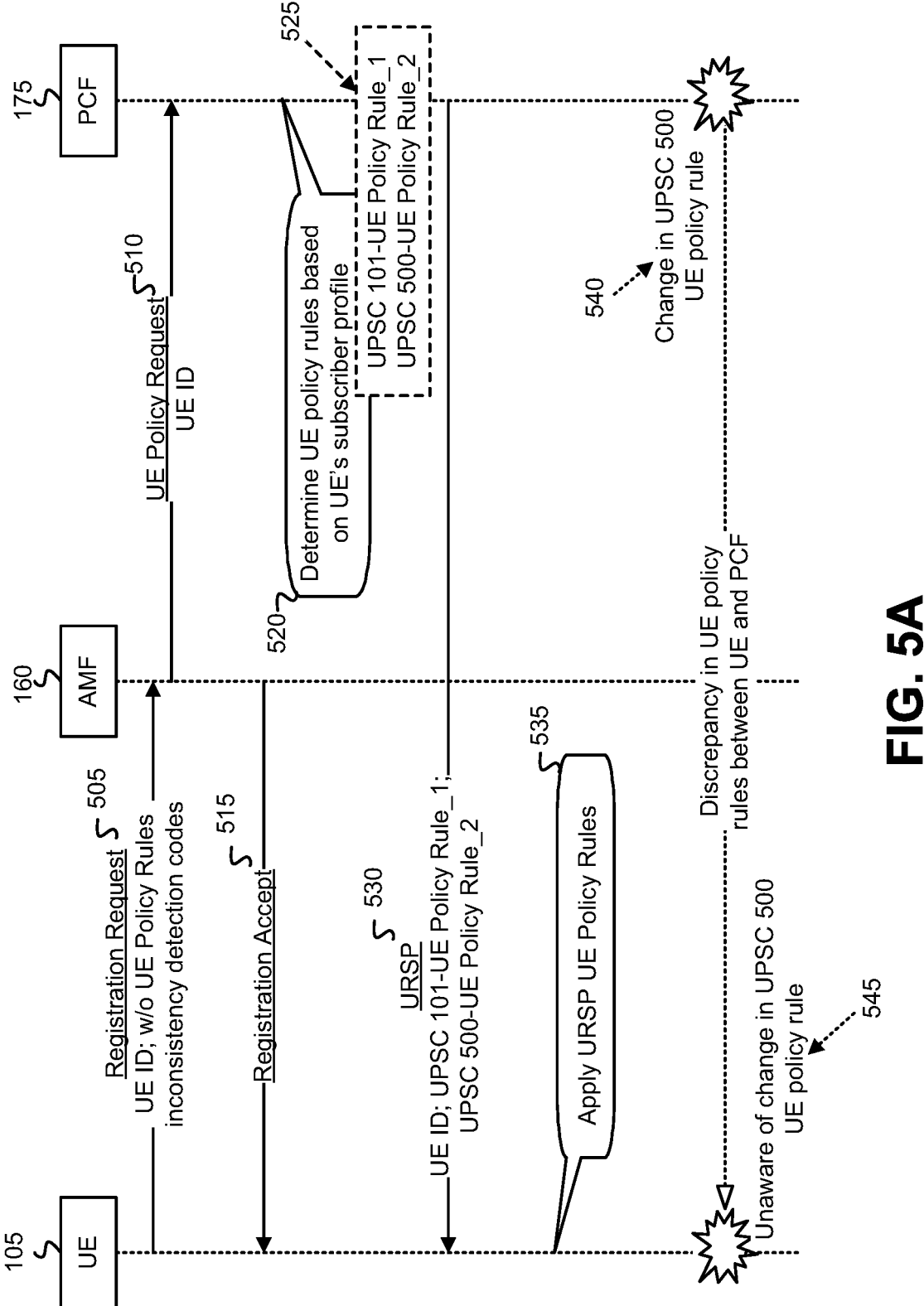
FIGS. 5A and 5B depict a sequence of operations, messages, and/or data flows associated with a first example process.

The exemplary process includes UE 105 sending a Registration Request to the AMF 160 (block 400). For example, when UE 105 powers up from a powered down state, or when UE 105 moves from a previous network service area into a geographic area serviced by mobile network 110, then UE 105 sends a Registration Request that identifies the UE 105, and which may not initially include any UPSC inconsistency detection codes. As shown in FIG. 5A, UE 105 sends a Registration Request 500 to AMF 160 that includes a UE ID and does not include UPSC inconsistency detection codes (described further below).

AMF 160, in response to receipt of the Registration Request from the UE 105, requests UE policy information from the PCF 175 (block 405), and returns a Registration Accept message to the UE 105 (block 410). The Registration Request initiates a process of interaction between UE 105, AMF 160, and PCF 175, described further below, to retrieve UE policy rules for the subscriber associated with UE 105 and distribute those UE policy rules to UE 105 for application to traffic at the UE 105. FIG. 5A depicts AMF 160, in response to receipt of the Registration Request 505 from UE 105, sending a UE Policy Request 510 to PCF 175 that includes the UE ID associated with UE 105. FIG. 5A further shows AMF 160 returning a Registration Accept message 515 to UE 105.

Upon receipt of the UE policy request from the AMF 160, PCF 175 determines UE policy rules based on the UE 105's subscriber profile (block 415) and sends UE Route Selection Policy (URSP) information to the requesting UE 105 (block 420). PCF 175, when the UE Policy Request is received from AMF 160 for UE 105, accesses the UE 105's subscriber profile (e.g., stored in memory locally at the PCF 175, or stored in a PCF-accessible memory that is remotely located relative to PCF 175), and determines a set of UE policy rules to be applied to the subscriber's traffic at the UE 105 based on the subscriber's profile. For example, each subscriber associated with a UE 105 may have a network subscription that includes a particular set of network slices that are part of the subscriber's subscription, and each subscriber's profile may include a different set of UE policy rules that are generated based on the particular set of network slices that are part of the subscriber's subscription. The set of UE policy rules may include multiple UE policy rules, with each having its own UPSC and an associated UE policy rule(s). The determined set of UE policy rules may, therefore, include the following: {UPSC_1, UE_Policy_Rule_1; UPSC_2, UE_Policy_Rule_2; UPSC_n, UE_Policy_Rule_n}. In one implementation, the URSP information returned by the PCF 175 to the UE 105 includes, among other information, the UPSCs and associated UE policy rules determined by the PCF 175 based on the UE 105's subscriber profile. FIG. 5A shows PCF 175 determining 520 UE policy rules based on the UE's subscriber profile, where, in this example, the UE policy rules 525 include UPSC 101 and associated UE policy Rule_1, and UPSC 500 and associated UE policy rule_2. FIG. 5A further shows PCF 175 sending a URSP message 530, where the URSP information in message 520 includes the UE 105's UE ID, UPSC 101 and associated UE Policy Rule_1, and UPSC 500 and associated UE Policy Rule_2.

UE 105 receives and applies UE policy rules from the URSP information (block 425). Upon receipt of the message from the PCF 175 containing the URSP information, the UE 105 extracts the UPSCs, and their associated UE policy rules, and stores them locally at the UE 105. UE 105 subsequently applies the UE policy rules to outgoing and/or incoming traffic at the UE 105. For example, UE 105 may apply multiple UE policy rules that route outgoing traffic via a selected network slice of multiple network slices based on which app 130, of multiple apps 130, is executing at UE 105 and generating the outgoing traffic. FIG. 5A depicts UE 105 applying 535 the URSP UE policy rules received from PCF 175, including UPSC 101-UE Policy Rule_1, and UPSC 500-UE Policy Rule_2. In the example of FIG. 5A, a change 540 in the UE policy rule associated with UPSC 500 occurs subsequent to PCF 175 sending the URSP message 530 to UE 105. This change in the UPSC 500's UE policy rule results in a discrepancy in UE policy rules between PCF 175 and UE 105, and also means that UE 105 is unaware 545 of the change in UPSC 500's UE policy rule. UE 105 will, therefore, continue to use the previous, now incorrect version of the UE policy rule associated with UPSC 500.

UE 105 determines inconsistency detection codes for UPSCs and their associated UE policy rules (block 430), and sends a Re-Registration Request to the AMF 160 that includes the UPSC inconsistency detection codes (block 435). The inconsistency detection code determination and Re-Registration Request of blocks 430 and 435 may, for example be performed periodically subsequent to receipt of the URSP message containing the UPSCs and UE policy rules (e.g., blocks 420 and 425). UE 105 may apply a code determination process to generate an inconsistency detection code for a given UPSC and its associated UE Policy Rule. The code determination process may include applying a function to the UPSC and its associated UE policy rule to generate a code that may be used to verify whether the UE policy rule has any changes relative to a previous version of the UPSC and UE policy rule. The function may include any function that repeatably generates a same output code based on a particular input UPSC and UE policy rule. In one implementation, the function may include any type of checksum function (e.g., parity byte, parity word, sum complement, Fletcher's checksum, Adler-32, cyclic redundancy check (CRC), fuzzy checksum). In another implementation, the function may include any type of hash function. The inconsistency detection code for the UPSC and its associated UE policy rule may be represented by, for example, a checksum or hash generated by applying the function to the UPSC and its associated UE policy rule. Other types of functions, such as functions that generate error detection codes, may alternatively be used to generate an inconsistency detection code based on the UPSC and its associated UE policy rule.

Figure 5B:
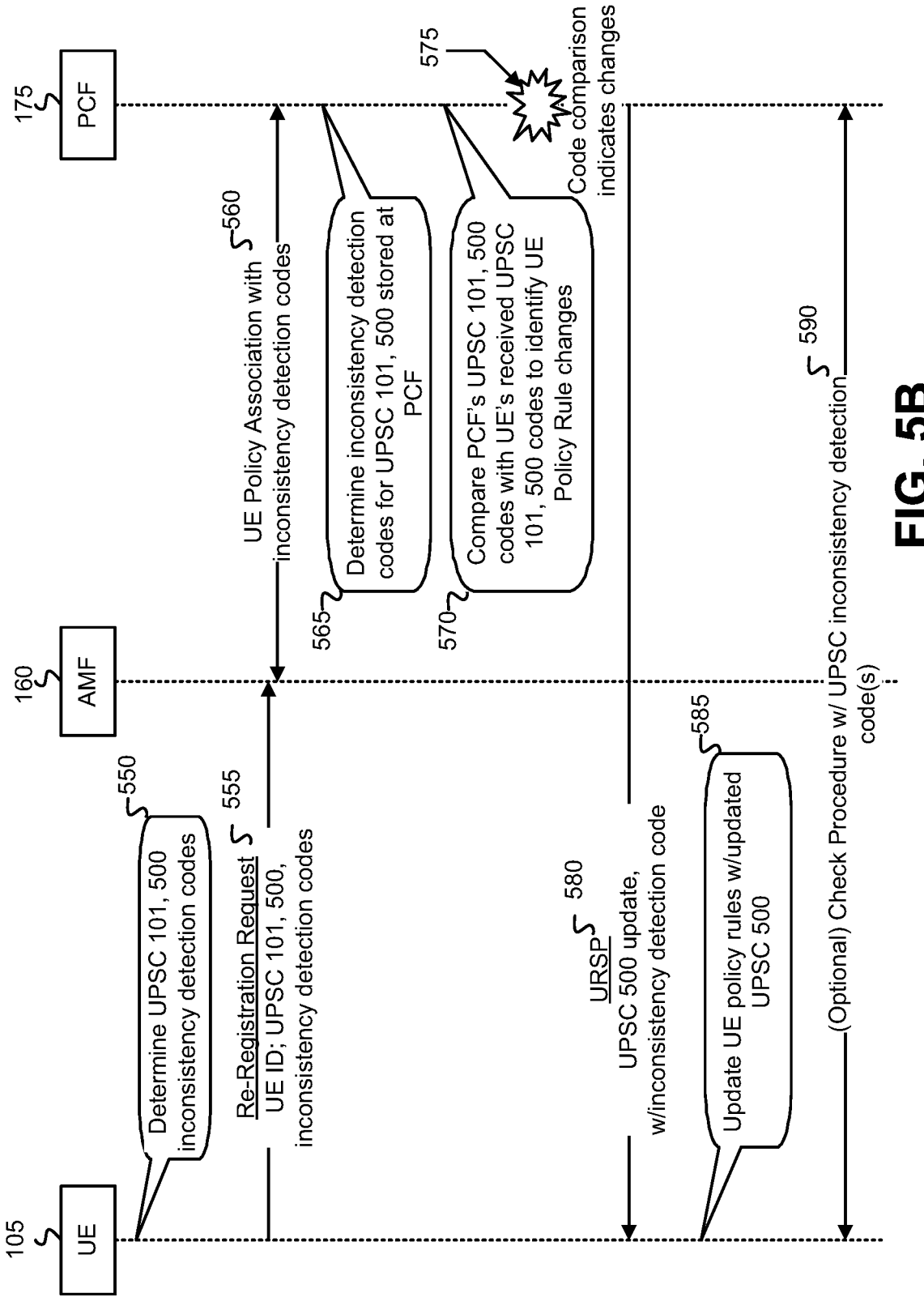

The example of FIG. 5B depicts UE 105 determining 550 inconsistency detection codes for UPSC's 101 and 500, and their associated UE policy rules. FIG. 5B further shows UE 105 sending a Re-Registration Request 555 to AMF 160 that includes a UE ID for UE 105, UPSCs 101 and 500, and the inconsistency detection codes for UPSCs 101 and 500 (e.g., UPSC 101—incon_det_code_101, UPSC 500—incon_det_code_500).

Upon receipt of the Re-Registration Request from the UE 105, the AMF 160 engages, with the PCF 175, in UE policy association with the received UPSC inconsistency detection codes (block 440). AMF 160 extracts the UPSCs, and their inconsistency detection codes, from the Re-Registration Request and engages in a process with PCF 175 to associate the inconsistency detection codes with the corresponding UPSCs stored at PCF 175. As a result of the UE policy association, each of the received UPSC inconsistency detection codes may be stored by PCF 175 such that the codes are associated, in memory, with the corresponding UPSC and UE policy rule. FIG. 5B depicts AMF 160 and PCF 175 engaging in a process 560 for associating the inconsistency detection codes received from UE 105, with UPSCs and UE policy rules stored at PCF 175.

PCF 175 compares the received UPSC inconsistency detection codes with the PCF's UPSC inconsistency detection codes (block 445), and determines if the code comparison indicates UPSC policy inconsistencies or changes between UE policies stored at the UE 105, and UE policies locally stored at PCF 175 (block 450). If the code comparison indicates UPSC policy inconsistencies/changes (YES-block 450), then PCF 175 sends URSP information to the UE 105, with UPSC policy rule update(s) and associated inconsistency detection code(s) (block 455). If the code comparison does not indicate UPSC policy changes/inconsistencies (NO-block 450), then the process may continue at block 465 below. PCF 175 retrieves the locally stored UPSCs, and their associated UE policy rules, for the UE 105 and applies a function to the UPSCs and/or UE policy rules to generate respective inconsistency detection codes (i.e., a code for each UPSC/UP policy rule combination). PCF 175 then compares the inconsistency detection codes received from UE 105 with the inconsistency detection codes generated by PCF 175. If one or more of the inconsistency detection codes are inconsistent with one another, then PCF 175 identifies the particular UPSC and UE policy rule as having changed relative to the version of the UPSC and UE policy rule stored at UE 105. In the case of the use of checksums for the inconsistency detection codes, if the checksums for a given UPSC do not match one another, then the PCF 175 determines that the associated UE policy rule at the PCF 175 has changed relative to the UE policy rule stored at the UE 105. PCF 175 formulates a URSP message that identifies the UPSC(s) of the UE policy rule(s) that has/have changed relative to the UE policy rule(s) stored at the UE 105. The URSP message further includes the UPSC's current version of the UE policy rule, and the UPSC's current inconsistency detection code. PCF 175 sends the message, with the URSP information, to the UE 105 such that the UE 105 can update its locally stored UE policy rules.

The example of FIG. 5B illustrates PCF 175 determining 565 inconsistency detection codes for UPSC 101 and 500 stored at PCF 175, and PCF 175 comparing 570 the PCF's inconsistency detection codes for UPSC 101 and 500 with the UE 105's received inconsistency detection codes for UPSC 101 and 500 to identify UE policy rule changes. As further shown in FIG. 5B, the comparison, in this example, indicates that the PCF's version of UPSC 500, and its associated UE policy rule, have changed 575 relative to the version of UPSC 500, and its UE policy rule, stored at UE 105. FIG. 5B further shows PCF 175 sending a URSP message 580 to UE 105 that includes the updated UE policy rule for UPSC 500, along with the inconsistency detection code for the updated UE policy rule.

UE 105 updates UE policy rules stored at the UE 105 with the updated policy rule(s) contained in the received URSP information (block 460). UE 105 replaces, in local memory, the UE policy rule(s) of the UPSC(s) identified in the URSP message with the UE policy rule and inconsistency detection code contained in the URSP message. FIG. 5B shows UE 105 updating 585 its locally stored UE policy rules with the updated UE policy rule associated with UPSC 500.

UE 105 may subsequently engage in a UPSC UE policy rule check procedure with the PCF 175 (block 465). As shown in FIG. 5B, the UPSC UE policy rule check procedure 590 may be an optional procedure that may occur periodically and may, for example, repeat blocks 435-460 to update the UE policy rules stored at UE 105 and thereby "synchronize" the UE 105's UE policy rules with the UE policy rules stored at PCF 175. The UE policy rule check procedure involves PCF 175 comparing the inconsistency detection codes for UE policy rules stored at PCF 175, with the inconsistency detection codes of corresponding UE policy rules stored at the UE 105, to determine inconsistencies between the codes. For UPSCs determined to have inconsistent detection codes stored at UE 105, then PCF 175 sends a URSP message with a UE policy rule update for the UPSC(s).

The blocks of FIGS. 4A and 4B may be repeated for each new Registration Request involving a UE 105 powering on within the wireless coverage area of mobile network 110, or entering the wireless coverage area of the mobile network 110 from another mobile network. Alternatively, the blocks of FIGS. 4A and 4B, or blocks 430-460, may be repeated periodically, or based on the occurrence of an event involving a UE 105, even after a UE 105 has initially registered with the mobile network 110. The blocks of FIGS. 4A and 4B may be executed in parallel for each UE 105 of numerous UEs 105 connected to mobile network 110.

FIGS. 6A and 6B are flow diagrams of an example mobile network-initiated process for determining UE policy rule changes for a mobile subscriber in a mobile network 110 and updating one or more UE policy rules at the UE 105 based on the determined UE policy changes. The example process of FIGS. 6A and 6B may be used as a mobile network-initiated alternative to the example process of FIGS. 4A and 4B, in which the UE 105 itself initiates a process for updating UE policy rules at the UE 105. The example process of FIGS. 6A and 6B may be implemented by various devices, nodes, and/or functions within the network environment 100 of FIG. 1, such as, for example, a UE 105, an AMF 160, and a PCF 175. The example process of FIGS. 6A and 6B may be implemented, for example, at each occurrence of a UE 105 registering with mobile network 110 to obtain network service (e.g., at UE power up, or upon a UE's movement into the mobile network 110's service area). The example process of FIGS. 6A and 6B is described with additional reference to FIGS. 7A and 7B.

Figure 7A:
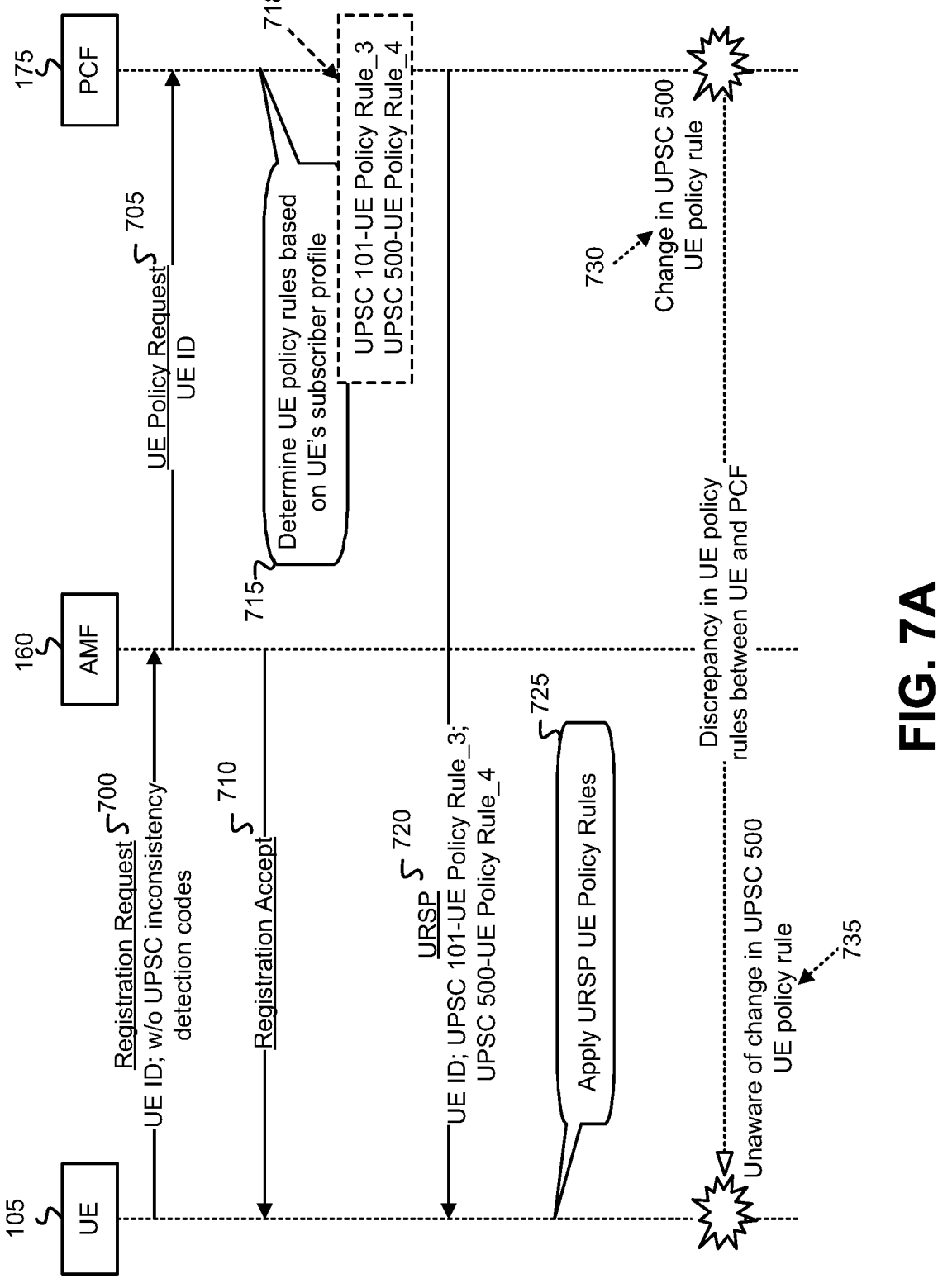
FIGS. 7A and 7B depict a sequence of operations, messages, and/or data flows associated with a second example process.

The example process includes UE 105 sending a Registration Request to AMF 160 (block 600). For example, when UE 105 powers up from a powered down state, or when UE 105 moves from a previous network service area into a geographic area serviced by mobile network 110, then UE 105 sends a Registration Request that identifies the UE 105 and which may not initially include any UPSC inconsistency detection codes. As shown in FIG. 7A, UE 105 sends a Registration Request 700 to AMF 160 that includes a UE ID and does not include UPSC inconsistency detection codes.

AMF 160, in response to receipt of the Registration Request from the UE 105, requests UE policy information from the PCF 175 (block 605), and returns a Registration Accept message to the UE 105 (block 610). The Registration Request initiates a process of interaction between UE 105, AMF 160, and PCF 175, described further below, to retrieve UE policy rules for the subscriber associated with UE 105 and distribute those UE policy rules to UE 105 for application to traffic at the UE 105. FIG. 7A depicts AMF 160, in response to receipt of the Registration Request 700 from UE 105, sending a UE Policy Request 705 to PCF 175 that includes the UE ID associated with UE 105. FIG. 7A further shows AMF 160 returning a Registration Accept message 710 to UE 105.

Upon receipt of the UE policy request from the AMF 160, PCF 175 determines UE policy rules based on the UE 105's subscriber profile (block 615), and sends UE Route Selection Policy (URSP) information to the requesting UE 105 (block 620). PCF 175, when the UE Policy Request is received from AMF 160 for UE 105, accesses the UE 105's subscriber profile (e.g., stored in memory locally at the PCF 175, or stored in a remotely located memory that is accessible to PCF 175), and determines a set of UE policy rules to be applied to the subscriber's traffic at the UE 105 based on the subscriber's profile. For example, each subscriber associated with a UE 105 may have a network subscription that includes a particular set of network slices that are part of the subscriber's subscription, and each subscriber's profile may include a different set of UE policy rules that are generated based on the particular set of network slices that are part of the subscriber's subscription. The set of UE policy rules may include multiple UE policy rules, with each having its own UPSC and an associated UE policy rule(s). The determined set of UE policy rules may, therefore, include the following: {UPSC_1, UE_Policy_Rule_1; UPSC_2, UE_Policy_Rule_2; UPSC_q, UE_Policy_Rule_q}. In one implementation, the URSP information returned by the PCF 175 to the UE 105 includes, among other information, the UPSCs and associated UE policy rules determined by the PCF 175 based on the UE 105's subscriber profile. FIG. 7A shows PCF 175 determining 715 UE policy rules based on the UE's subscriber profile, where, in this example, the UE policy rules 718 include UPSC 101 and UE Policy Rule_3, and UPSC 500 and UE Policy rule_4. FIG. 7A further shows PCF 175 sending a URSP message 720, where the URSP information includes the UE 105's UE ID, UPSC 101 and associated UE Policy Rule_3, and UPSC 500 and associated UE Policy Rule_4.

UE 105 receives and applies UE policy rules from the URSP information (block 625). Upon receipt of the message from the PCF 175 containing the URSP information, UE 105 extracts the UPSCs, and their associated UE policy rules, and stores them locally at the UE 105. UE 105 subsequently applies the UE policy rules to outgoing and/or incoming traffic at the UE 105. For example, UE 105 may apply multiple UE policy rules that route outgoing traffic via a selected network slice of multiple network slices based on which app 130, of multiple apps 130, is executing at UE 105 and generating the outgoing traffic. FIG. 7A depicts UE 105 applying 725 the URSP UE policy rules received from PCF 175, including UPSC 101-UE Policy Rule_3, and UPSC 500-UE Policy Rule_4. In the example of FIG. 7A, a change 730 in the UE policy rule associated with UPSC 500 occurs subsequent to PCF 175 sending the URSP message 720 to UE 105. This change in the UPSC 500's UE policy rule results in a discrepancy in UE policy rules between PCF 175 and UE 105, and also means that UE 105 is unaware 735 of the change in UPSC 500's UE policy rule. UE 105 will, therefore, continue to use the previous, incorrect version of the UE policy rule associated with UPSC 500.

Figure 7B:
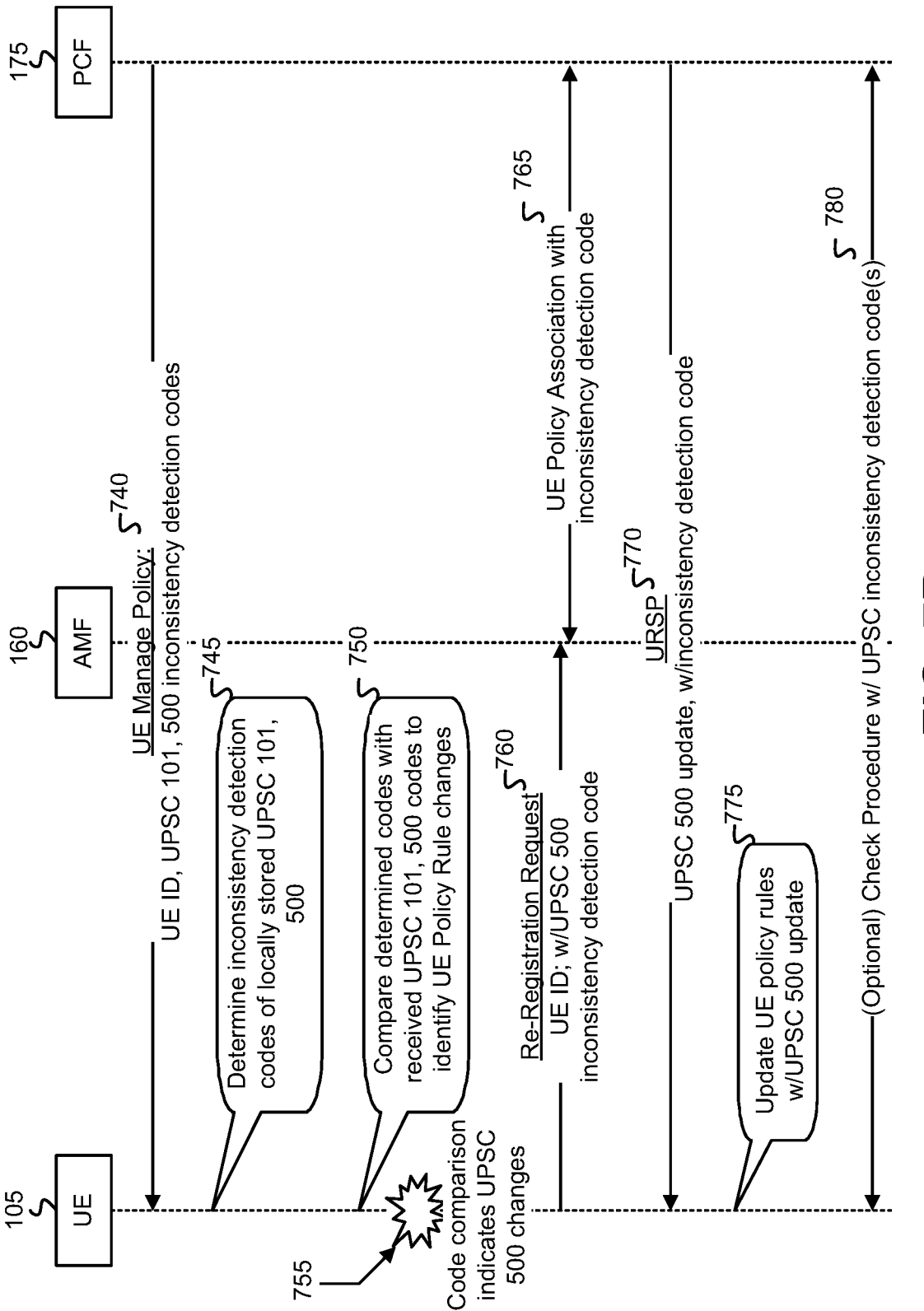

Subsequently, PCF 175 sends a UE Manage Policy message that includes UPSC inconsistency detection codes (block 630). PCF 175 may send the UE Manage Policy message, with UPSC inconsistency detection codes, to UE 105, periodically or upon the occurrence of an event. In one implementation, the event may include a possible change in a UE policy rule associated with a UPSC. In another implementation, PCF 175 may send the UE Manage Policy message automatically at some periodic interval after the URSP message, with UPSC and UE policy rules, is sent to UE 105. The UE Manage Policy message may include only the UPSC, and associated inconsistency detection code, for each UE policy rule that might have changed. Alternatively, the message may include the UPSCs, and associated inconsistency detection codes, for a full set of current UE policy rules obtained from the UE subscriber's subscriber profile. One or more of the UE policy rules for a particular UE 105 may change for various reasons, such as, for example, due to a change in the subscriber profile of the user associated with the UE 105 (e.g., a change in subscribed network slices), or due to a change in network slices that are currently configured for mobile network 110. In the example of FIG. 7B, PCF 175 sends a UE Manage Policy message 740 that includes the UE 105's UE ID, and the inconsistency detection codes for UPSC 101 and UPSC 500—which are associated with the two UE policy rules currently in use at UE 105. As shown, PCF 175 may send the UE Manage Policy message 735 upon occurrence of the change 730 in UPSC 500's UE policy rule.

Upon receipt of the UE Manage Policy message, UE 105 determines inconsistency detection codes for locally stored UPSCs (e.g., previously received from the PCF 175 in block 620) and their associated UE policy rules (block 635), and compares the determined inconsistency detection codes with the received UPSC inconsistency detection codes (e.g., received in block 630) (block 640). In an implementation in which the inconsistency codes are checksums, then UE 105 applies a checksum function to each UPSC, and its associated UE policy rule, to derive checksum inconsistency detection codes for the locally stored UPSCs and UE policy rules. For example, applying a checksum function to UPSC 101 and UE Policy Rule_3 results in checksum_1, and applying a checksum function to UPSC 500 and UE Policy Rule_4 results in checksum_2. In an implementation that uses checksums for the inconsistency detection codes, if a comparison of corresponding checksums indicate that the checksums are not identical, then UE 105 may identify the corresponding UE policy rule as having changed relative to the version locally stored at UE 105. If the code comparison indicates UPSC policy changes/inconsistencies (YES—block 645), then UE 105 sends a Re-Registration Request to the AMF 160, including the UPSC inconsistency detection code(s) of the identified inconsistent UE policy rule(s) (block 650). As described above, UE 105 may apply a code determination process (e.g., a checksum function) to generate an inconsistency detection code for each UPSC, and its associated UE Policy Rule, stored at UE 105. The function may include any function that repeatably generates a same output code based on a particular input UPSC and UE policy rule, such as a checksum or hash function. If the code comparison does not indicate UPSC policy changes/inconsistencies (NO-block 645), then the process may continue at block 670 below.

FIG. 7B depicts UE 105 determining 745 inconsistency detection codes of locally stored UPSC 101, and its UE policy rule, and UPSC 500, and its UE policy rule, and UE 105 further comparing 750 the determined codes with the UPSC 101 and UPSC 500 inconsistency detection codes received from PCF 175. As further shown, the comparison

750 of the inconsistency detection codes for UPSC 101 and UPSC 500 indicates changes 755 in the UE policy rule associated with UPSC 500. UE 105, based on the code comparison and as shown in FIG. 7B, formulates a Re-Registration Request 760, that includes the UE 105's UE ID, and UPSC 500's inconsistency detection code (determined in block 635), and sends the Request 755 to AMF 160.

Upon receipt of the Re-Registration Request from the UE 105, AMF 160 engages, with the PCF 175, in UE policy association with the received UPSC inconsistency detection code(s) (block 655). AMF 160 extracts the UPSCs, and their inconsistency detection codes, from the Re-Registration Request and engages in a process with PCF 175 to associate the inconsistency detection codes with the corresponding UPSCs stored at PCF 175. As a result of the UE policy association, each of the received UPSC inconsistency detection codes may be stored by PCF 175 such that the codes are associated, in memory, with the corresponding UPSC and UE policy rule. FIG. 7B depicts AMF 160 and PCF 175 engaging in a process 765 for associating the inconsistency detection codes received from UE 105, with UPSCs and UE policy rules stored at PCF 175.

PCF 175 returns URSP information to the UE 105, including a UPSC policy rule update(s) and associated inconsistency detection code(s) (block 660). PCF 175 formulates a URSP message that identifies the UPSC(s) of the UE policy rule(s) that has/have changed relative to the UE policy rule(s) stored at the UE 105 (i.e., the UPSC(s) and UE policy rule(s) identified in block 645). The URSP message further includes the UPSC's current version of the UE policy rule(s), and the UPSC's current inconsistency detection code(s). PCF 175 sends the message, with the URSP information to the UE 105 such that the UE 105 can update its locally stored UE policy rules. In the example of FIG. 7B, in which UE 105 has sent a Re-Registration Request 760 with UPSC 500's inconsistency detection code identifying UPSC 500 as possibly having a UE policy rule that has changes relative to the version of UPSC 500 stored at UE 105, PCF 175 sends a URSP message 770 to UE 105 that includes the updated UE policy rule for UPSC 500, along with the inconsistency detection code for the updated UE policy rule.

UE 105 updates UE policy rules stored at the UE 105 with the updated policy rule(s) contained in the received URSP information received from the PCF 175 (block 665). UE 105 replaces, in local memory, the UE policy rule(s) of the UPSC(s) identified in the URSP message with the UE policy rule(s) and inconsistency detection code contained in the URSP message. FIG. 5B shows UE 105 updating 775 its locally stored UE policy rules with the updated UE policy rule associated with UPSC 500.

The UE 105 subsequently engages in a UPSC policy rule check procedure with the PCF 175 (block 670). As shown in FIG. 7B, the UPSC UE policy rule check procedure 780 may be an optional procedure that may occur periodically and may, for example, repeat blocks 630-665 to update the UE policy rules stored at UE 105 and thereby "synchronize" the UE 105's UE policy rules with the UE policy rules stored at PCF 175. The UE policy rule check procedure involves UE 105 comparing the inconsistency detection codes for UE policy rules locally stored at UE 105, with the inconsistency detection codes of corresponding UE policy rules received from PCF 175 via a UE Manage Policy message, to determine inconsistencies between the codes. When one or more UPSCs are determined to have an inconsistent detection code stored at UE 105, UE 105 sends a Re-Registration Request message to PCF 175 to initiate PCF 175 returning URSP information to the UE 105 that includes the updated UE policy rule(s) of UPSCs identified by the UE 105.

The blocks of FIGS. 6A and 6B may be repeated for each new Registration Request involving a UE 105 powering on within the wireless coverage area of mobile network 110, or entering the wireless coverage area of the mobile network 110 from another mobile network. Alternatively, the blocks of FIGS. 6A and 6B, or blocks 630-665, may be repeated periodically, or based on the occurrence of an event involving a UE 105, even after a UE 105 has initially registered with the mobile network 110. The blocks of FIGS. 6A and 6B may be executed in parallel for each UE 105 of numerous UEs 105 connected to mobile network 110.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 4A, 4B, 6A, and 6B, and sequences of operations, messages, and/or data flows with respect to FIGS. 5A, 5B, 7A, and 7B, the order of the blocks and/or the operations, messages, and/or data flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processing unit 320) of a device. A non-transitory storage medium includes one or more of the storage mediums described in relation to memory 330. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a first device, User Equipment device (UE) Policy Section Codes (UPSCs) and a first version of associated UE policy rules;
receiving, by the first device, first inconsistency detection codes for the UPSCs and a current version of the associated UE policy rules;
determining, by the first device based on the UPSCs and the first version of the associated UE policy rules, second inconsistency detection codes;
comparing, by the first device, the first and second inconsistency detection codes to identify inconsistencies between the first version of the UE policy rules and the current version of the UE policy rules;
sending, by the first device when the comparison identifies the inconsistencies, a request for updated UE policy rules; and
receiving, by the first device, one of the UPSCs and an updated version of an associated UE policy rule of the one of the UPSCs.

2. The method of claim 1, wherein the UPSCs and the first version of associated UE policy rules are received from a second device in a first UE Route Selection Policy (URSP) message and wherein the one of the UPSCs and the updated version of the associated UE policy rule of the one of the UPSCs are received from the second device in a second URSP message.

3. The method of claim 1, wherein receiving, by the first device, the first inconsistency detection codes, occurs at a time subsequent to receiving the UPSCs and the first version of associated UE policy rules.

4. The method of claim 1, wherein the first inconsistency detection codes for the UPSCs and a current version of the associated UE policy rules is received by the first device from a second device via a UE Manage Policy message.

5. The method of claim 1, wherein the UPSCs and the first version of the associated UE policy rules, and the first inconsistency detection codes, are received by the first device from a second device, and wherein the first device comprises a UE and the second device comprises a device implementing a Policy Control Function (PCF) in a mobile network.

6. The method of claim 1, wherein the request for updated UE policy rules comprises a Re-Registration Request for re-registering with a mobile network.

7. The method of claim 1, wherein the comparing the first and second inconsistency detection codes further identifies a first UE policy rule of the first version of the UE policy rules that is inconsistent with a corresponding UE policy rule of the current version of the UE policy rules.

8. The method of claim 7, wherein the request for updated UE policy rules comprises a Re-Registration Request for re-registering with a mobile network and wherein the Re-Registration Request includes a UPSC associated with the identified first UE policy rule of the first version of the UE policy rules.

9. A first device, comprising:
at least one communication interface configured to:
receive User Equipment device (UE) Policy Section Codes (UPSCs) and a first version of associated UE policy rules, and
receive first inconsistency detection codes for the UPSCs and a current version of the associated UE policy rules;
at least one processor configured to:
determine, based on the UPSCs and the first version of the associated UE policy rules, second inconsistency detection codes;
compare the first and second inconsistency detection codes to identify inconsistencies between the first version of the UE policy rules and the current version of the UE policy rules;
send, via the at least one communication interface when the comparison identifies the inconsistencies, a request for updated UE policy rules; and
receive one of the UPSCs and an updated version of an associated UE policy rule of the one of the UPSCs.

10. The first device of claim 9, wherein the UPSCs and the first version of associated UE policy rules are received from a second device in a first UE Route Selection Policy (URSP) message and wherein the one of the UPSCs and the updated version of the associated UE policy rule of the one of the UPSCs are received from the second device in a second URSP message.

11. The first device of claim 9, wherein receiving, by the first device, the first inconsistency detection codes, occurs at a time subsequent to receiving the UPSCs and the first version of associated UE policy rules.

12. The first device of claim 9, wherein the first inconsistency detection codes for the UPSCs and a current version of the associated UE policy rules is received by the first device from a second device via a UE Manage Policy message.

13. The first device of claim 9, wherein the UPSCs and the first version of the associated UE policy rules, and the first inconsistency detection codes, are received by the first device from a second device, and wherein the first device comprises a UE and the second device comprises a device implementing a Policy Control Function (PCF) in a mobile network.

14. The first device of claim 9, wherein the request for updated UE policy rules comprises a Re-Registration Request for re-registering with a mobile network.

15. The first device of claim 9, wherein the comparing the first and second inconsistency detection codes further identifies a first UE policy rule of the first version of the UE policy rules that is inconsistent with a corresponding UE policy rule of the current version of the UE policy rules.

16. The first device of claim 15, wherein the request for updated UE policy rules comprises a Re-Registration Request for re-registering with a mobile network and wherein the Re-Registration Request includes a UPSC associated with the identified first UE policy rule of the first version of the UE policy rules.

17. A non-transitory storage medium storing instructions executable by a first device, wherein execution of the instructions causes the first device to:

receive User Equipment device (UE) Policy Section Codes (UPSCs) and a first version of associated UE policy rules;

receive first inconsistency detection codes for the UPSCs and a current version of the associated UE policy rules;

determine, based on the UPSCs and the first version of the associated UE policy rules, second inconsistency detection codes;

compare the first and second inconsistency detection codes to identify inconsistencies between the first version of the UE policy rules and the current version of the UE policy rules;

send, when the comparison identifies the inconsistencies, a request for updated UE policy rules; and receive one of the UPSCs and an updated version of an associated UE policy rule of the one of the UPSCs.

18. The non-transitory storage medium of claim 17, wherein receiving, by the first device, the first inconsistency detection codes occurs at a time subsequent to receiving the UPSCs and the first version of associated UE policy rules.

19. The non-transitory storage medium of claim 17, wherein the UPSCs and the first version of the associated UE policy rules, and the first inconsistency detection codes, are received by the first device from a second device, and wherein the first device comprises a UE and the second device comprises a device implementing a Policy Control Function (PCF) in a mobile network.

20. The non-transitory storage medium of claim 17, wherein the comparing the first and second inconsistency detection codes further identifies a first UE policy rule of the first version of the UE policy rules that is inconsistent with a corresponding UE policy rule of the current version of the UE policy rules.

\* \* \* \* \*